UNITED STATES PATENT OFFICE.

ALFRED MORRIS POSENER, OF LONDON, AND FREDERICK WILLIAM CLERKE, OF TOTTENHAM, ENGLAND, ASSIGNORS TO THE "N. L." SYNDICATE, LIMITED, OF COUNTY OF MIDDLESEX, ENGLAND.

PROCESS OF MAKING WATERPROOF FABRIC AND PRODUCT THEREOF.

SPECIFICATION forming part of Letters Patent No. 680,734, dated August 20, 1901.

Application filed September 13, 1900. Serial No. 29,960. (No specimens.)

*To all whom it may concern:*

Be it known that we, ALFRED MORRIS POSENER, merchant, residing at Finsbury House, Blomfield street, London, and FREDERICK WILLIAM CLERKE, residing at 21 Willoughby Lane, Park, Tottenham, in the county of Middlesex, England, subjects of the Queen of Great Britain, have invented a new and useful Process of Making Waterproof Fabric and the Product Thereof, of which the following is a specification.

Our process consists in the subjection of a woven fabric made out of woolen, cotton, or other animal or vegetable fibrous material to the action of the following compositions, as hereinafter described.

The first composition is made as follows: (A) One pound of glue, five pounds of coloring material, and one-half pound of silicate of soda. The coloring material preferably consists of whiting, ocher, and Venetian red combined in the following proportions: one pound of ocher, one and one-half pounds of whiting, and one-quarter of a pound of Venetian red. The glue is dissolved in one gallon of hot water and the coloring material and silicate of soda are added to the solution and thoroughly mixed with it.

The second composition is as follows: (B) Two and one-half pounds of boiled oil and three and one-half pounds of coloring material, consisting of the same ingredients mixed in the same proportions as in mixture A.

The weights above given are sufficient for treating five pounds of the woven fabric, which is used as the base. We then dip the woven fabric which constitutes the base in the mixture A or brush said mixture over the fabric for about thirty minutes at a temperature of about 90° Fahrenheit. The base is then thoroughly dried, which will take from one to two days with the aid of artificial heat or about four days if left to dry naturally. We then pass the dried base between pressure-rollers or submit it to pressure in an ordinary press. We then rub it on one side only with pumice-stone dipped in the mixture B, not heated, and then again thoroughly dry it, which takes about one day with the aid of artificial heat or about four days if allowed to dry naturally. We then treat the other side in precisely the same way. We then again rub the first side with pumice-stone dipped in the mixture B, not heated, and again thoroughly dry it, which takes from one to two days with the aid of artificial heat or nine to ten days if allowed to dry naturally. The second side is then treated in precisely the same way. The entire process is now complete; but the manufactured material should be allowed to remain for a further time to season, which will take from one to four days with the aid of artificial heat or nine to ten days if left to dry naturally.

The surface may be printed with any design in the usual way. The aqueous mixture A forms a flexible covering for the woven fabric after it is dried thereon, and the oil in the mixture B becomes partially absorbed and combined with the dried coating formed by the mixture A, so that the outer oily coating becomes firmly adherent to and part of the inner coating, which in turn is firmly adherent to the woven base.

Other coloring materials may evidently be used instead of ocher and Venetian red.

The product of this process is a waterproof fabric which may be used as an excellent substitute for leather for many purposes, as as well as a substitute for linoleum for floor-covering and other purposes.

Having thus described our invention, what we claim, and desire to secure by Letters Patent of the United States, is—

1. The process of making waterproof fabric, which consists in subjecting a woven base to the action of an aqueous mixture containing waterproofing material, drying said base, subjecting said dried base to the action of an oily mixture, and drying said base, substantially as described.

2. The process of making waterproof fabric, which consists in subjecting a woven base to the action of an aqueous solution containing glue, coloring material and silicate of soda, drying said base, subjecting it to the action of a mixture containing boiled oil and coloring material, and finally drying said base, substantially as described.

3. The process of making waterproof fabric, which consists in subjecting a woven base to the action of an aqueous solution containing glue, coloring material and silicate of soda combined in the proportions specified, drying said base, subjecting it to the action of a solution containing boiled oil and coloring material combined in the proportions specified and finally drying said base, substantially as described.

4. The process of making waterproof fabric, which consists in subjecting a suitable woven base to the action of an aqueous waterproofing solution containing glue, coloring material and silicate of soda combined in the proportions specified, drying said base, subjecting it to pressure, subjecting it to the action of a mixture composed of boiled oil and coloring material combined in the proportions specified, and finally drying said base, substantially as described.

5. In the process of making waterproof material, the step which consists in subjecting a suitable woven base to the action of aqueous waterproofing solution containing glue, coloring material and silicate of soda, substantially as described.

6. As a new article of manufacture, a waterproof fabric obtained by subjecting a suitable woven base to the action of a solution containing glue, coloring material and silicate of soda, and afterward subjecting said base to the action of a mixture containing boiled oil and coloring material substantially as described.

In testimony whereof we have affixed our signatures in the presence of two witnesses.

ALFRED MORRIS POSENER.
FREDERICK WILLIAM CLERKE.

Witnesses:
EDMUND EDWARDS,
ARTHUR E. EDWARDS.